US006944817B1

(12) United States Patent
Danneels

(10) Patent No.: US 6,944,817 B1
(45) Date of Patent: Sep. 13, 2005

(54) METHOD AND APPARATUS FOR LOCAL GENERATION OF WEB PAGES

(75) Inventor: Gunner D. Danneels, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 09/589,535

(22) Filed: Jun. 7, 2000

Related U.S. Application Data

(63) Continuation of application No. 08/828,580, filed on Mar. 31, 1997.

(51) Int. Cl.[7] ........................... G06F 17/00; G06F 17/30
(52) U.S. Cl. ....................... 715/513; 715/500.1; 707/1; 707/10
(58) Field of Search ................................ 707/500, 501, 707/513, 526, 530, 1–6, 100; 709/200, 201–203, 219, 225–227, 310–312

(56) References Cited

U.S. PATENT DOCUMENTS

| 4,885,775 A | | 12/1989 | Lucas | |
|---|---|---|---|---|
| 5,530,852 A | | 6/1996 | Meske, Jr. et al. | |
| 5,727,156 A | * | 3/1998 | Herr-Hoyman et al. | 709/219 |
| 5,819,092 A | * | 10/1998 | Ferguson et al. | 705/39 |
| 5,845,084 A | * | 12/1998 | Cordell et al. | 709/234 |
| 5,987,480 A | * | 11/1999 | Donohue et al. | 707/501.1 |
| 6,012,070 A | * | 1/2000 | Cheng et al. | 707/505 |
| 6,141,666 A | * | 10/2000 | Tobin | 707/513 |
| 6,304,893 B1 | * | 10/2001 | Gish | 707/10 |

OTHER PUBLICATIONS

Laura Lemay, "Chapter 17, Basic Forms", teach yourself WebPublishing with HTML 3.2 in a week, Sams.net Publishing, Third Edition, 1996, pp. 463–488.
Laura Lemay, "Chapter 18, Beginning CGI Scripting", teach yourself WebPublishing with HTML 3.2 in a week, Sams.net Publishing, Third Edition, 1996, pp. 489–517.
User Guide vol. II, "Template Language Extension", Intershop Communications, Chapter 4, 1997–1998, pp. 44–49.
User Guide vol. II, "Templates", Intershop Communications, Chapter 5, 1997–1998, pp. 62–169.

* cited by examiner

Primary Examiner—Alford W. Kindred
(74) Attorney, Agent, or Firm—Blakely, Sokoloff, Taylor & Zafman LLP

(57) ABSTRACT

A method and apparatus for performing dynamic modification of templates based on a local user profile is provided. A document is received from a server by a client. The document includes one or more placeholders. The placeholders may be set off by escape sequences, for example. The client parses the document to locate the one or more placeholders. The client substitutes for the one or more placeholders data that is based upon local content stored on the client. The local content may be stored in a local user profile in the form of a database or a registry file, for example. The document may be in the form of a generic Hypertext Markup Language (HTML) template. If this is the case, the substitution includes translating the generic HTML template into an HTML document by replacing the one or more placeholders with HTML expressions.

9 Claims, 5 Drawing Sheets

US 6,944,817 B1

METHOD AND APPARATUS FOR LOCAL GENERATION OF WEB PAGES

RELATED APPLICATIONS

The present application is a continuation application of application No. 08/828,580 filed Mar. 31, 1997, entitled "METHOD AND APPARATUS FOR LOCAL GENERATION OF WEB PAGES", and assigned to the assignee of the present invention.

FIELD OF THE INVENTION

The invention relates generally to the communication of documents from servers to clients. More specifically, the invention relates to a method and apparatus for local translation of templates transmitted by a server.

BACKGROUND OF THE INVENTION

The architecture of the World Wide Web (the Web) follows a conventional client-server model. The terms "client" and "server" are used to refer to a computer's general role as a requester of data (the client) or provider of data (the server). Web clients and Web servers communicate using a protocol such as Hypertext Transfer Protocol (HTTP). In the Web environment, Web browsers reside on clients and Web documents (pages) reside on servers. The client-server model is used to communicate information between clients and servers. Web servers are coupled to the Internet and respond to document requests from Web clients. When a user selects a document by submitting its Uniform Resource Locator (URL), a Web browser, such as Netscape Navigator opens a connection to a server and initiates a request (e.g., an HTTP get) for the document. The server delivers the requested document, typically in the form of a static text document coded in a standard markup language such as Hypertext Markup Language (HTML). The document is static in the sense that it exists in a constant state and each user that requests the document will see more or less the same content (subject to differences in browser functionality).

Currently, when an HTML document needs to be dynamically modified for a particular user, the Web server will solicit required data from the user by way of an HTML form. Upon receipt of the required data, the Web server performs the customization of the requested HTML document. HTML files are typically dynamically generated/modified by programs residing on Web servers called CGI scripts. Common Gateway Interface (CGI) is a simple protocol that facilitates communication of information entered into HTML forms to CGI scripts. CGI scripts are commonly used to access legacy information systems such as existing documents or databases. For example, a CGI script might query a database using the information from an HTML form and output the results of the query to the client. In other instances, CGI scripts may simply insert the information provided in the HTML form directly into a requested HTML document.

This conventional method of customizing HTML documents for a particular user is illustrated by FIG. 1. In FIG. 1, a client 105 is coupled to a server 110 through the Internet 130. The client communicates with the server 110 via a browser 125 executing on the client 105. The server 110 includes an HTTP interface 115 for recognizing and processing HTTP requests and a Common Gateway Interface (CGI) script 120 for processing information from HTML form 149.

In this example, when the client 105 sends a request for a document, the server transmits an encoded HTML document representing HTML form 149. The browser 125 receives the encoded HTML document and renders HTML form 149 on the display (not shown). The HTML form 149 includes two text entry fields 146 and 147 and a submit button 148. After the local user has completed HTML form 149 and selected the submit button 148, the values entered into text fields 146 and 147 are transmitted by the browser 125 to the server 110. Upon receiving the values for text fields 146 and 147, the server 110 executes CGI script 120 which dynamically generates output, typically representing an HTML document, based upon the values received. The output of CGI script 120 is received by the browser 125 and displayed in the form of a tailored output 170. In this manner, the server 110 tailors a document for a particular user.

The current use of HTML forms and CGI scripts to tailor HTML documents is inefficient and undesirable under many circumstances. For example, to accommodate the current method of tailoring HTML documents, large amounts of data must sometimes be transmitted from the client to the server. Often the very same information is required to customize various pages of the Web, thus requiring the user to continually retype such information. Also, it should be appreciated that Web servers are optimized for transferring files rather than running CGI scripts. Moreover, a user may not want to transmit certain private information such as the user's name, social security number, account numbers, and other sensitive information over the Internet.

In light of the foregoing, it is desirable to provide a mechanism that allows the client to dynamically modify the content of an HTML document locally based upon information stored on the client system. It is further desirable to provide a mechanism for incorporating private information into an HTML document received from a remote server without the user having to risk transmitting the private information through the Internet to the remote server.

SUMMARY OF THE INVENTION

A method and apparatus are described for performing dynamic modification of templates based on a local user profile. A document is received from a server by a client. The document includes one or more placeholders. The client parses the document to locate the one or more placeholders. The client substitutes for the one or more placeholders data that is based upon local content stored on the client.

According to another aspect of the present invention, the document is a generic Hypertext Markup Language (HTML) template. The substitution includes translating the generic HTML template into an HTML document by replacing the one or more placeholders with HTML expressions.

One advantage of using templates is the load on the server's central processing unit can be reduced by allowing clients to perform some of the dynamic modification currently performed by servers.

Other features and advantages of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for dynamic modification of templates based on a local user profile is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Hardware Overview

Figure 1:
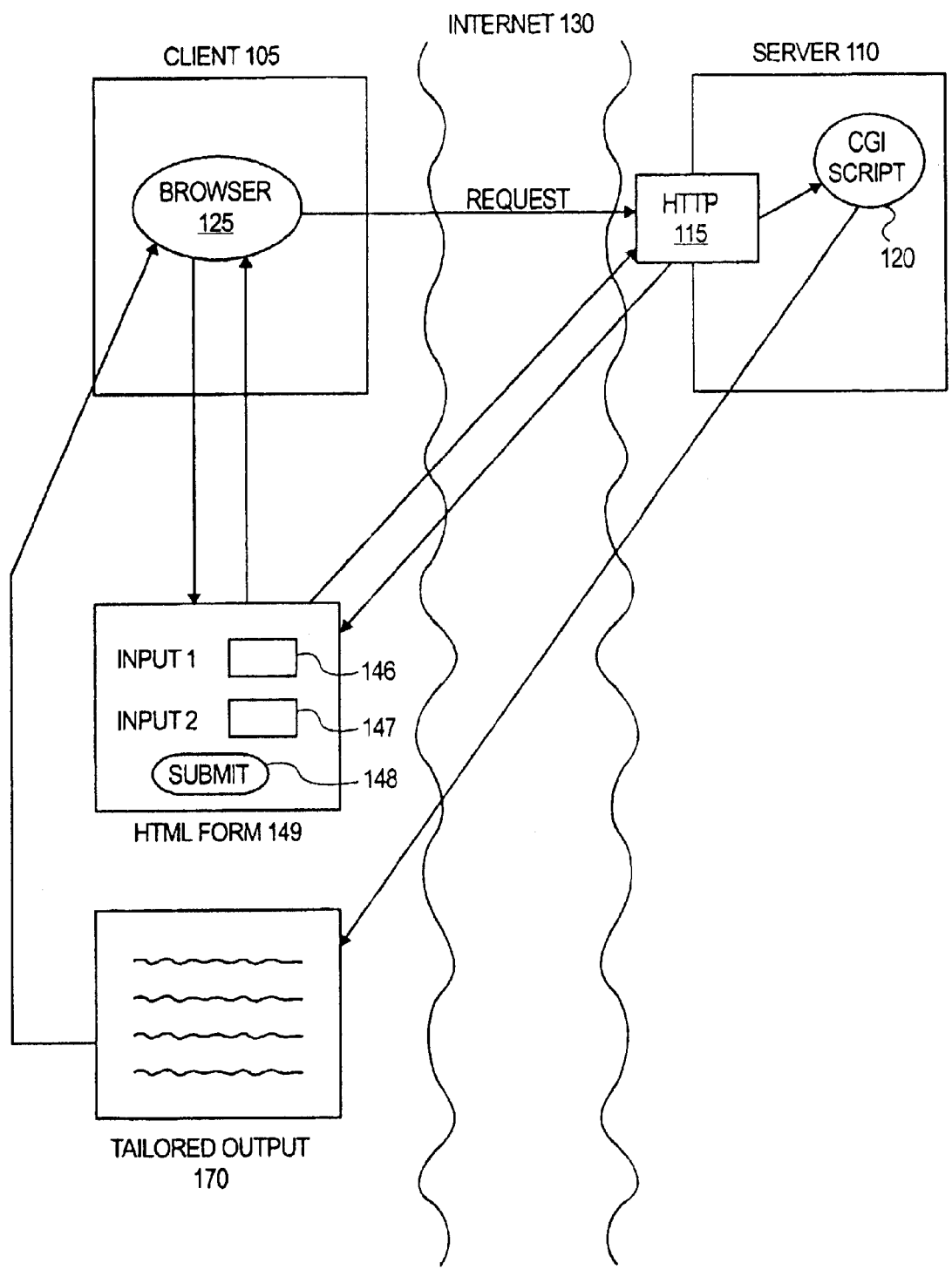
FIG. 1 illustrates a prior mechanism for tailoring Web pages for a particular user.
Figure 2:
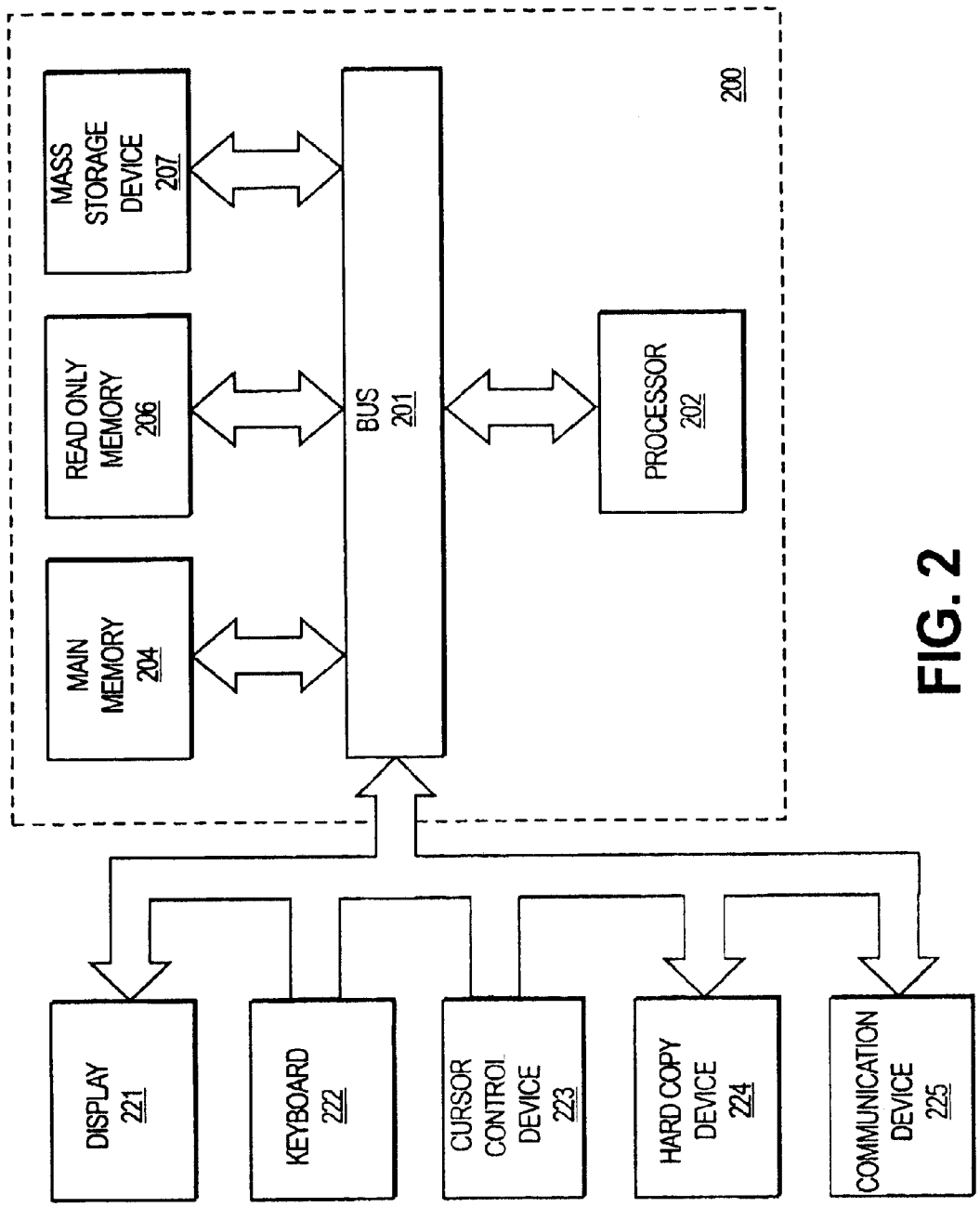
FIG. 2 is an example of a typical computer system upon which one embodiment of the present invention can be implemented.

Referring to FIG. 2, a computer system is shown as 200. The computer system 200 represents an exemplary client system upon which one embodiment of the present invention can be implemented.

Computer system 200 comprises a bus or other communication means 201 for communicating information, and a processing means 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202. Data storage device 207 is coupled to bus 201 for storing information and instructions.

A data storage device 207 such as a magnetic disk or optical disc and its corresponding drive can be coupled to computer system 200. Computer system 200 can also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. Alternatively, other input devices such as a stylus or pen can be used to interact with the display. Another device which may optionally be coupled to bus 201 is a hard copy device 224 which may be used for printing instructions, data or other information on a medium such as paper, film, or similar types of media.

A communication device 225 is also coupled to bus 201 for accessing a remote server via the Internet, for example. The communication device 225 may include a conventional modem or any of a number of commercially available networking peripheral devices such as those used for coupling to an Ethernet, token ring, or wide area networks.

The present invention is related to the use of computer system 200 for dynamically modifying a template received from a server based upon a user profile stored in main memory 204 or on the data storage device 207. In one embodiment, as computer system 200 executes a program such as a Web browser, the processor 202 accesses data stored in a detailed local user profile on data storage device 207 to facilitate modification of an HTML template received from a Web server.

Local Generation of Web Pages

Figure 3:
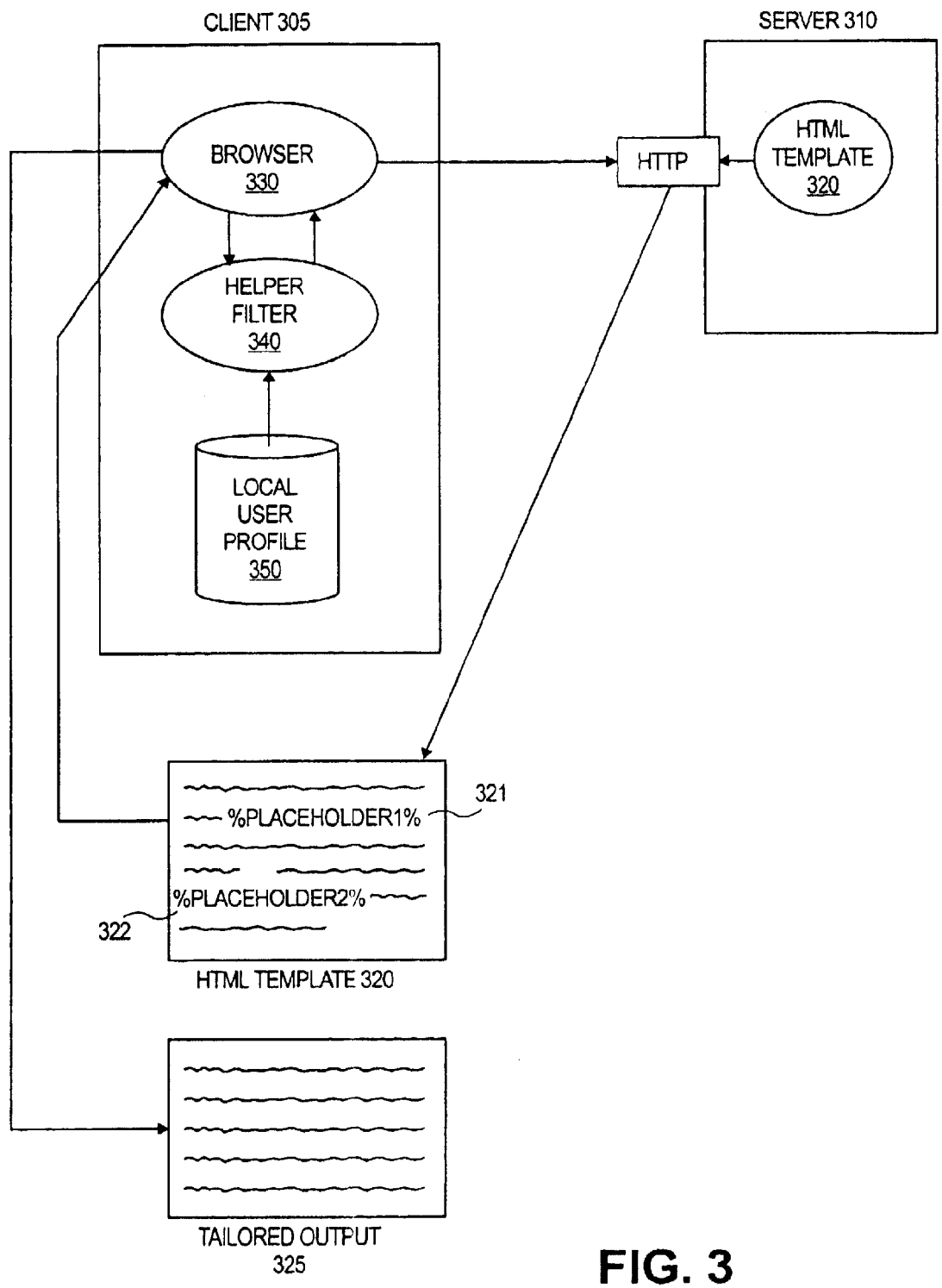
FIG. 3 illustrates a mechanism which provides for local generation of Web pages by a client according to one embodiment of the present invention.

FIG. 3 illustrates a mechanism which provides for local generation of Web pages by a client according to one embodiment of the present invention. In this embodiment, when client 305 receives a file having a file format of type "template," described below, the client translates the file using a local user profile 350 to generate a tailored output 325.

Server 310 is a computer system such as a personal computer or a workstation. The server's geographic proximity to client 305 is immaterial so long as a means of communication is provided between the server 310 and the client 305. For example, server 310 may be a remote Web server accessible to client 305 via the Internet or server 310 may be a node in a local or wide area network which includes client 305. Server 310 stores a generic HTML template 320 which is appropriately parameterized so as to be applicable to all users. In this example, HTML template 320 includes two placeholders, placeholder 1 321 and placeholder 2 322. After the client 305 replaces placeholders 321 and 322 with local content, the tailored output 325 is displayed. While it should be apparent, it is worthy of note that in generating an HTML document from an HTML template, the client can replace the placeholders with any valid HTML expression.

Similar to server 310, client 305 may also be a general purpose computer system or a workstation. Client 305 is shown executing a browser 330 and a helper filter 340. Browser 330 represents a Web browser, such as Netscape or Mosaic, that is capable of interfacing with external helper applications.

When an application such as a Web browser encounters a file format that cannot be read by its built-in capabilities, it is common for the application to pass the file to an external helper application so that the file can be processed or translated into a form recognizable by the application. While Web browsers typically have built-in capability to read HTML-formatted documents as well as other graphic file formats such as GIF and JPEG, interpretation of other file formats sometimes requires external helper applications. External helper applications are commonly used for audio and video file formats, for example. To accommodate file formats that require helper applications, browsers maintain a mapping of file formats to helper applications. The mapping may be based upon Multipurpose Internet Mail Extensions (MIME) types or based upon file extensions (e.g., a ".zip" extension suggests the file is compressed).

In one embodiment, browser 330 associates the file format of template files with an external helper application such as helper filter 340. Helper filter 340 is configured to translate template files such as HTML template 320, into a form recognizable by browser 330. This translation and the form of HTML template 320 will be discussed further below. Importantly, while in this embodiment the helper filer 340 is shown as separate from the browser 330, it will be appreciated that the helper filter 340 need not be an external application. Thus, in alternative embodiments, the functionality of helper filter 340 can be incorporated into the browser 330.

Local user profile 350 is preferably a detailed user profile containing all information the user would like an application to have access to for template processing. In an example discussed below, investment portfolio information is stored in a local user profile. The investment portfolio information may include shares, purchase prices, ticker symbols, and other information relevant to evaluating a portfolio's performance. In any event, the local user profile 350 should include at least data commonly used for tailoring HTML documents to particular users such as the local user's name, address, age, electronic mail (email) address, and phone numbers. In a computer system running Windows 95™, the local user profile 350 might be included within the Windows™ registry file. However, the local user profile 350 is not limited to such a file. Rather, the local user profile 350 can be maintained in a local database or any other file so long as helper filter 340 is configured appropriately so as to find it. In any event, in the simplest case, the helper filter 340 retrieves information from the local user profile 350 and substitutes such information for placeholders embedded in template files transmitted by servers such as server 310. More complex substitutions will be discussed further below. At this point, it is instructive to further describe template files.

Templates

Templates may be static files residing on the server or they may be dynamically generated by CGI scripts. As will be illustrated below, one advantage of using templates is the load on the server's CPU can be reduced by allowing clients to perform some of the dynamic modification currently performed by servers.

A template file may be thought of as a generic template that is applicable to all users. Templates are generic in the sense that they include placeholders identifying locations in the file in which information specific to a particular user is to be substituted. Templates may additionally contain boilerplate that is appropriate for all users. For example, an HTML template such as HTML template 320 might contain standard encoded HTML data relevant to all users and one or more placeholders to be replaced by information based on local user content. When the HTML template is received by a client such as client 305, the placeholders are used by helper filter 340 to retrieve local content from the local user profile 350.

Preferably, the naming convention used for placeholders allows data in the local user profile 350 to be uniquely identified and retrieved. For example, a placeholder may be a logical name which can be used for a database lookup. Additionally, to facilitate parsing of placeholders, the placeholders can be set off by an escape sequence such as the "%" symbols as depicted in HTML template 320. It will be recognized that numerous other ways of marking placeholders are possible.

Further, a hierarchy of placeholders may be established. Placeholders can be atoms or operations that operate on atoms arbitrarily complex. Some placeholders, set off by a first type of escape sequence (e.g., "%"), may be directly replaced by local content from a local user profile. However, others, set off by a second type of escape sequence (e.g., "@"), may require further local evaluation before substitution is performed. It is appreciated that numerous other ways of implementing placeholders are possible.

Finally, applications running on clients need to be able to distinguish templates from traditional HTML documents and other file formats. Therefore, template files can be identified by a file extension such as ".tem" and/or by an experimental MIME type accompanying the file transfer such as "application/x-filter." In this manner, applications receiving templates will recognize them as such and can process them accordingly with the assistance of a helper application such as helper filter 340, for example.

Investment Portfolio Evaluation Example

Figure 4A:
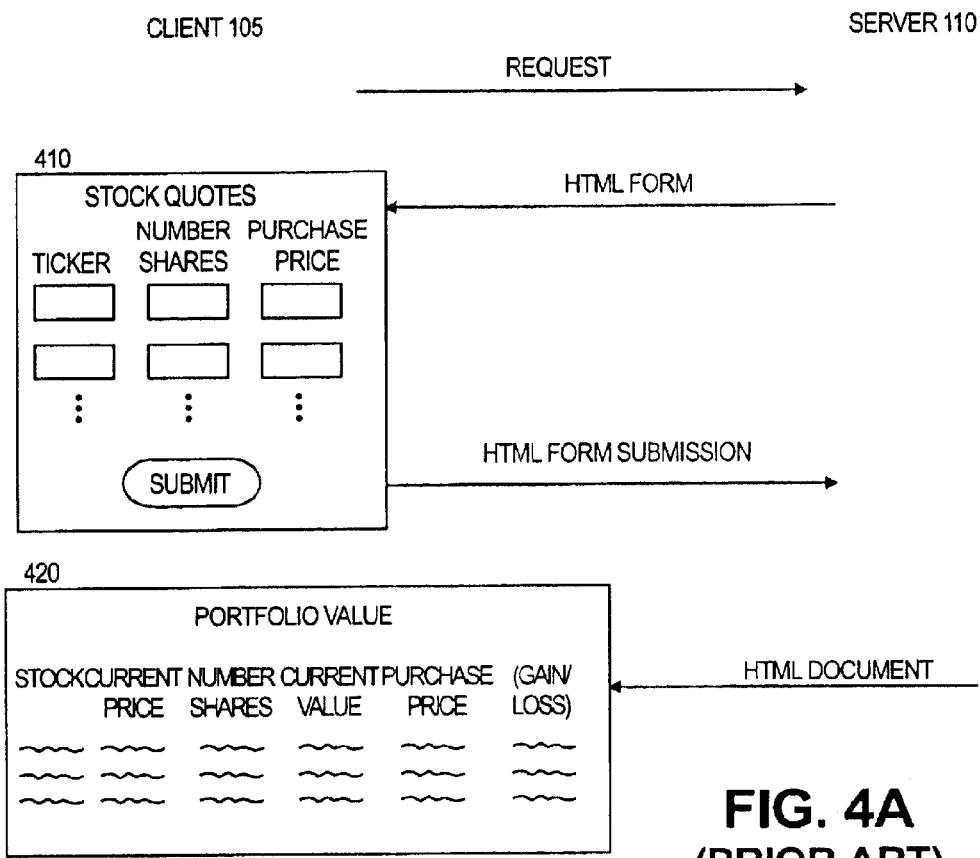
FIG. 4A illustrates information passing that is required for the prior Web page tailoring method.

FIG. 4A illustrates information passing that is required for the prior Web page tailoring method. Initially, a request is made by the client 105 for an HTML form from the server 110. The server 110 transmits HTML form 410 to the client. In this example, HTML form 410 is for the purpose of retrieving from the server 110 current share prices of particular stocks in the local user's portfolio. In order to receive an accurate portfolio valuation, the local user is required to submit at least the ticker symbols of the stocks owned and the corresponding number of shares for each ticker symbol. To get further information such as the net increase or decrease in value for a particular stock, additional information such as the purchase price, and any commission paid for each stock might be required. At any rate, after the necessary information is submitted to the server, the server incorporates the information into an HTML document such as 420. This scenario illustrates some of the disadvantages of server-side customization of Web pages. For example, the server 110 must perform all the customization of HTML document 420 locally using server CPU resources. Also, the client 105 must potentially transmit a significant amount of information to the server 110 some of which is simply transmitted back to the client within HTML document 420. Further, the local user may consider some of this information to be private.

Figure 4B:
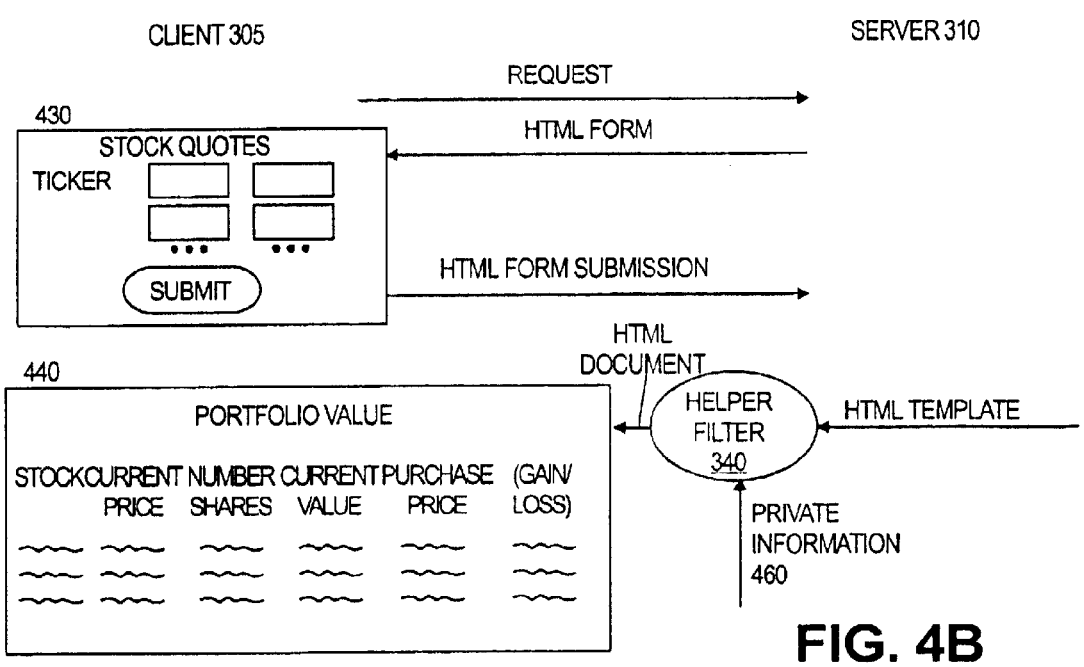
FIG. 4B illustrates how private information can be dynamically added to an HTML template by a client according to one embodiment of the present invention.

Investment Portfolio Evaluation Example Without Transmission of Private Information FIG. 4B illustrates how private information can be dynamically added to an HTML template by the client according to one embodiment of the present invention. It is desirable to offload servers when possible. Therefore, generally, when data is locally available on a client or readily capable of determination by the client, the data should not be transmitted to a server simply to have it incorporated into an HTML document by the server. Rather, from the perspective of the server, a more efficient approach is to have such data incorporated by the client. Local generation of an HTML document is particularly desirable from the user's perspective when private information is involved. For example, in the current portfolio valuation example, it is acceptable to transmit information such as the ticker symbols that will be used to access a database residing on the server. However, there is no need to transmit private information such as the purchase price and number of shares for each stock to the server, and it is inefficient to do so.

As above, the client 305 initially requests a document from the server 310. In response to the client request, server 310 transmits HTML form 430 to client 305. Again, the HTML form received is for the purpose of evaluating the local user's stock portfolio. Importantly, however, in this example, the user need not provide what may be considered private information to the server 310. After receiving the ticker values, the server 310 provides an HTML template to the client 305 rather than a fully tailored HTML document as above. The HTML template includes placeholders for number of shares (e.g., % #_shares_1%, % #_shares_2%, etc.) and placeholders for purchase prices (e.g., % purchase_price 1%, % purchase_price_2%, etc.). The HTML template further includes placeholders that will require local evaluation such as the current valuations of particular stocks (e.g., @ % #_shares_1%*12.50@). The helper filter 340 replaces the placeholders with the appropriate private information 460 from the local user profile 350, performs any required calculations, and produces HTML document 440 for rendering by the browser 330. Advantageously, in the manner described above, a local user need not risk exposure of private information and server CPU resources can be conserved.

Exemplary Method of Displaying a Template

Figure 5:
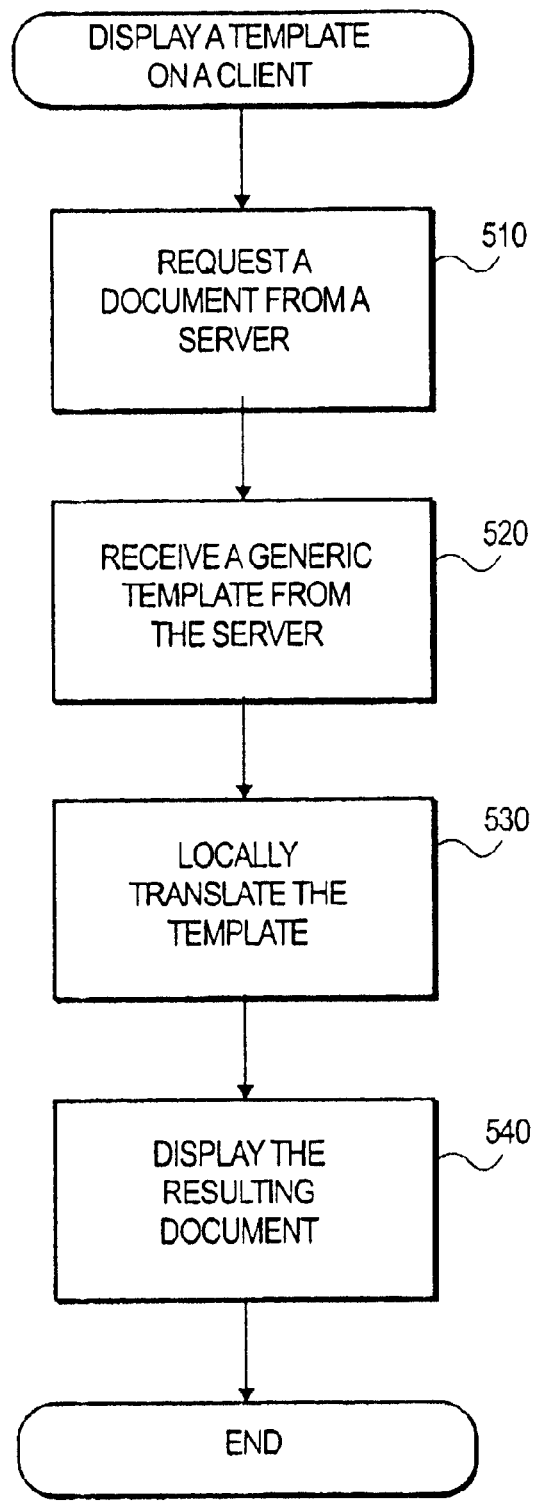
FIG. 5 is a flow diagram illustrating a method of displaying a template on a client according to one embodiment of the present invention.

FIG. 5 is a flow diagram illustrating a method of displaying a template on a client according to one embodiment of the present invention. At step 510, a client such as client 305 requests a document from a server such as server 310. In response to the request, the server transmits a generic template such as HTML template 320 to the client. Alternatively, the server may send an unsolicited generic template. The unsolicited generic template may be an email message, for example.

At step 520, the client receives the generic template from the server. If the server also transmitted information identifying the file format of the generic template such as a MIME type, the client can determine the appropriate method of processing the template based upon the MIME type. For example, the application receiving the template may pass the template to a helper application such as helper filter 340 if the receiving application cannot interpret the template itself.

In any event, the generic template includes one or more placeholders, as described above. The placeholders occupy positions in the template where substitution of local content is required. At step 530, the template is locally translated by the client. This translation includes parsing the template to locate placeholders, retrieving local information corresponding to each particular placeholder from a storage area on the client such as local user profile 350, and substituting the local information for the one or more placeholders in the template. In an alternative embodiment, the helper filer 340 additionally includes an evaluator. The evaluator is capable of performing simple calculations and calculations as complex as spreadsheet functions. The evaluator is useful for processing placeholders that include arithmetic operations involving local content, for example. In this embodiment, the translation processing discussed above further includes evaluation of such placeholders prior to the substitution step.

At step 540, the resulting translated document is displayed by the client. For example, if the resulting translated document is an HTML document, a browser such as browser 330 can interpret and render the document onto a local display. It should be noted that the output of the helper filter 340 is not limited to HTML documents. The helper filter 340 may output other recognizable document formats such as that of an excel spreadsheet.

Thus, a method and apparatus for dynamic modification of templates based on a local user profile has been described. Importantly, while embodiments of the present invention have been described with respect to HTML templates, those of ordinary skill in the art will appreciate that the present invention is not limited to any particular form of template. For example, the method and apparatus of the present invention are not limited to HTML templates. Rather, the disclosed method and apparatus is useful for incorporating local user content into other templates as well. For example, the assignees of the present invention anticipate templates will be useful in connection with the transmission of bulk email to several users. Using templates the email greeting may have the form, "Dear % username %," for example. It will be evident that various further modifications and changes may be made without departing from the broader spirit and scope of the invention. The specification and drawings are, accordingly, to be regarded in an illustrative rather than a restrictive sense.

What is claimed is:

1. A method performed by a Web client comprising:

sending a Transmission Control Protocol/Internet Protocol (TCP/IP) request for a Hypertext Markup Language (HTML) document to a remote Web server;

receiving the requested HTML document using TCP/IP, the HTML document including one or more placeholders;

parsing the received HTML document for the one or more placeholders;

creating a customized HTML document by replacing the placeholders in the HTML document using local content on the Web client; and displaying the customized HTML document using a Web browser executing on the Web client.

2. The method of claim 1, wherein creating the customized HTML document comprises, for each of the one or more placeholders, replacing the placeholder with local content directly if the placeholder is of a first type, and evaluating the placeholder using local content to determine a result and replacing the placeholder with the result if the placeholder is of a second type.

3. The method of claim 1, wherein the local content comprises a user profile.

4. A machine-readable medium containing data representing instructions that, when executed by a processor of a Web client, cause the Web client to perform operations comprising:

sending a Transmission Control Protocol/Internet Protocol (TCP/IP) request for a Hypertext Markup Language (HTML) document to a remote Web server;

receiving the requested HTML document using TCP/IP, the HTML document including one or more placeholders;

parsing the received HTML document for the one or more placeholders;

creating a customized HTML document by replacing the placeholders in the HTML document using local content on the Web client; and displaying the customized HTML document using a Web browser executing on the Web client.

5. The machine-readable medium of claim 4, wherein creating the customized HTML document comprises, for each of the one or more placeholders, replacing the placeholder with local content directly if the placeholder is of a first type, and evaluating the placeholder using local content to determine a result and replacing the placeholder with the result if the placeholder is of a second type.

6. The method of claim 4, wherein the local content comprises a user profile.

7. A Web client comprising:

a communications device to send a Transmission Control Protocol/Internet Protocol (TCP/IP) request for a Hypertext Markup Language (HTML) document to a remote Web server, the communications device further to receiving the requested HTML document using TCP/IP, wherein the HTML document includes one or more placeholders;

a memory to store local content coupled to a processor;

the processor coupled to the communications device to parse the received HTML document for the one or more placeholders, and to create a customized HTML document by replacing the placeholders in the HTML document using the local content stored in the memory; and a display device coupled to the processor to display the customized HTML document using a Web browser being executed by the processor.

8. The Web client of claim 7, wherein the processor creates the customized HTML document by, for each of the one or more placeholders, replacing the placeholder with local content directly if the placeholder is of a first type, and evaluating the placeholder using local content to determine a result and replacing the placeholder with the result if the placeholder is of a second type.

9. The Web client of claim 7, wherein the local content comprises a user profile.

* * * * *